(12) United States Patent
von Bismarck

(10) Patent No.: US 6,574,574 B1
(45) Date of Patent: Jun. 3, 2003

(54) METHOD OF AND APPARATUS FOR ASCERTAINING THE GENUINENESS OF PACKAGED COMMODITIES

(75) Inventor: Gottfried von Bismarck, Hamburg (DE)

(73) Assignee: Hauni Maschinenbau AG, Hamburg (DE)

( * ) Notice: Subject to any disclaimer, the term of this patent is extended or adjusted under 35 U.S.C. 154(b) by 184 days.

(21) Appl. No.: 09/694,028

(22) Filed: Oct. 23, 2000

Related U.S. Application Data

(63) Continuation-in-part of application No. 09/671,585, filed on Sep. 28, 2000.

(30) Foreign Application Priority Data

Sep. 30, 1999 (DE) .......................................... 199 47 282
Oct. 23, 1999 (DE) .......................................... 199 51 140

(51) Int. Cl.⁷ ................................................. G06K 9/00
(52) U.S. Cl. ........................... 702/81; 382/103; 340/5.8
(58) Field of Search ............................. 702/81; 382/100, 382/103, 112; 340/5.8

(56) References Cited

U.S. PATENT DOCUMENTS

| | | | |
|---|---|---|---|
| 3,974,007 A | | 8/1976 | Greve |
| 4,412,505 A | | 11/1983 | Haüsler et al. |
| 4,471,866 A | | 9/1984 | Erdmann et al. |
| 4,651,756 A | * | 3/1987 | Luke et al. .................. 131/284 |
| 4,766,911 A | * | 8/1988 | Oglesby ...................... 131/281 |
| 5,135,008 A | | 8/1992 | Oesterling et al. |
| 6,246,778 B1 | * | 6/2001 | Moore ......................... 340/5.1 |
| 6,456,729 B1 | * | 9/2002 | Moore ......................... 382/103 |

FOREIGN PATENT DOCUMENTS

| | | |
|---|---|---|
| DE | 40 00 658 | 8/1990 |
| DE | 400 00 658 | 8/1990 |
| DE | 196 42 793 | 4/1998 |
| DE | 196 45 630 | 5/1998 |
| DE | 197 34 828 | 2/1999 |
| DE | 197 53 333 | 6/1999 |
| DE | 198 27 412 | 12/1999 |
| EP | 0 330 495 | 8/1989 |
| EP | 0 562 349 | 9/1993 |
| EP | 0 902 275 | 3/1999 |
| GB | 2 337 974 | 12/1999 |

* cited by examiner

Primary Examiner—Kamini Shah
(74) Attorney, Agent, or Firm—Venable LLP.; Robert Kinberg

(57) ABSTRACT

The genuineness of commodities, such as arrays of filter cigarettes in containers of the type having a closure is ascertained by providing the commodities with identifying indicia prior to their confinement in containers. The containers carry encoded symbols which are supposed to be indicative of the contents of the respective containers. In order to ascertain whether or not the contents of a container are indeed products of the manufacturer or distributor the name and/or the trademark of which appears on the container, the closure is opened or removed, the contents of the container are identified by a detector which monitors the indicia, and the thus obtained signal is compared with the signal which is obtained as a result of decoding the symbol which is applied to the container.

20 Claims, 3 Drawing Sheets

METHOD OF AND APPARATUS FOR ASCERTAINING THE GENUINENESS OF PACKAGED COMMODITIES

CROSS-REFERENCE TO RELATED CASES

This is a continuation-in-part of the commonly owned copending parent application Ser. No. 09/671,585 filed Sep. 28, 2000 for "METHOD OF AND APPARATUS FOR ENCODING AND RECORDING IDENTIFYING INDICIA FOR ARRAYS OF ROD-SHAPED COMMODITIES", and claiming the priority of commonly owned German patent application Ser. No. 19947282.3, filed Sep. 30, 1999, for which the right of priority is claimed in the present application as to the subject matter common to the parent application and the present application.

The present application additionally claims the priority of commonly owned German patent application Ser. No. 199 51 140.3 filed Oct. 23, 1999. The disclosure of the above-referenced U.S. application and the above-referenced German patent applications, as well as that of each US and foreign patent and patent application identified in the specification of the present application, is incorporated herein by reference.

BACKGROUND OF THE INVENTION

The present invention relates to the making, confinement and ascertainment of genuineness of confined commodities, especially to the making, arraying, confinement and ascertainment of genuineness of groups of discrete commodities, such as arrays of plain or filter cigarettes or other types of rod-shaped articles of the tobacco processing industry. Examples of commodities which can be made and the origin of which can be ascertained in accordance with the method and in the apparatus of the present invention are so-called soft and hinged-lid packs of plain and filter cigarettes. Therefore, this application will discuss primarily the making and further processing of packs of cigarettes and of the contents of such packs but with the understanding that the invention can be practiced with equal or similar advantage in connection with the making and processing of containers for other discrete products of the tobacco processing industry as well as of commodities in fields other than the making, packing and other modes of processing smokers' products.

It is customary to confine arrays of, e.g., five, ten, nineteen or twenty cigarettes in containers or packets each of which is made of two or more layers of suitable wrapping material. For example, a so-called hinged-lid pack can contain an array of twenty cigarettes in the customary quincunx formation, an inner envelope of a metalic sheet material (such as tinfoil), a second envelope or box made of cardboard or plastic material and surrounding the array, the inner envelope as well as a customary stiffening collar, and an outermost envelope consisting of cellophane or other suitable transparent or translucent sheet material and often containing a so-called tear strip or tear tape. The outermost envelope surrounds the box and must be removed, at least in part, in order to afford access to the pivotable lid of the box.

It is becoming progressively more popular and more advisable to provide a technique of detecting the existence of foregeries, i.e., to establish a procedure which enables a person or an organization to ascertain whether or not commodities provided with the trademark(s) and/or other indicia denoting the products offered for sale by a reputable manufacturer of cigarettes or other types of grouped or arrayed rod-shaped commodities are properly labelled or are products offered for sale or being sold by imitators. The detection of forgeries or the absence of requisite numbers of cigarettes in a packaged array is complicated because a soft pack or a hinged-lid pack of cigarettes must be opened if an inspector or an apparatus is to gain access to the contents of the pack.

Otherwise stated, it is advisable to ensure that the information borne by the visible parts of a cigarette pack (i.e., the information at the exterior of that envelope or those envelopes which can be inspected without opening the pack) is truly indicative of the quantity and/or origin of the contents of the pack.

The aforementioned commonly owned U.S. patent application Ser. No. 09/671,585 discloses a method of and an apparatus for providing rod-shaped articles with indicia the distribution and/or the nature of which is ascertained by a detector and the thus obtained information is applied to the exterior of one of the converted blanks forming part of the envelope or packet of a cigarette pack or another commodity wherein one or more parts or elements or members are confined in an envelope.

The method and the apparatus of the present invention provide additional modes of and means for ascertaining the genuineness or lack of genuineness of packaged goods, e.g., arrays of plain or filter cigarettes. The purpose is to ascertain whether or not the information borne by a packet or another suitable receptacle is indeed (i.e., truly) representative of the packaged contents.

OBJECTS OF THE INVENTION

An object of the present invention is to provide a method of facilitating the identification (such as the ascertainment of genuineness or lack of genuineness) of the contents of containers or receptacles or packets for discrete commodities or groups of commodities, such as arrays of cigarettes or other rod-shaped articles of the tobacco processing industry, without it being invariably necessary to at least partially affect the integrity of the containers.

Another object of the invention is to provide a method of making and/or processing discrete commodities (such as plain or filter cigarettes) and/or their containers in such a way that the genuineness or lack of genuineness of the products can be ascertained without it being necessary to manipulate the containers in a manner other than that being customarily resorted to by a purchaser or owner of the commodity or commodities.

A further object of the invention is to provide a novel series of steps of associating or disassociating the contents of cigarette packs or the like with or from the asserted or assumed maker or makers of the contents and/or of the containers in a simple, time saving and relatively inexpensive manner.

An additional object of the instant invention is to provide a novel and improved apparatus for the practice of the above outlined method.

Still another object of the invention is to provide a machine or apparatus which is constructed and assembled to monitor normally concealed or confined products, such as cigarettes or other types of rod-shaped commodities, for their association or lack of association with the asserted or reported processor and/or distributor of such products.

A further object of the invention is to provide novel and improved means for facilitating the identification of plain or filter cigarettes or analogous rod-shaped smokers' products while the products are confined and at least partially concealed in packs and/or other types of receptacles or containers.

An additional object of the invention is to provide a novel and improved technique of facilitating the detection of imitations of established smokers' products.

SUMMARY OF THE INVENTION

One feature of the present invention resides in the provision of a method of ascertaining the genuineness of the contents of containers which confine commodities and bear information purporting to denote the originator (such as the maker and/or distributor) of the commodities. The commodities in the containers are provided with indicia which denote the actual originator of the commodities. The method comprises the steps of generating a first signal which denotes the information borne by the containers, at least partially opening the containers to afford access to the indicia of the commodities in the containers, generating second signals denoting the information represented by the accessible indicia, and comparing the first signals with the respective second signals.

The commodities can constitute arrays or groups of parallel rod-shaped smokers' products such as filter cigarettes.

The information which is borne by the containers is or can be encoded, and the method then further comprises the step of decoding the information which is borne by a container prior to the generation of the first signal.

The containers are or can be provided with closures (such as the customary lids of hinged-lid cigarette packs) which must be manipulated to gain access to the confined commodities. The opening step of the method which deals with the testing or handling of such containers preferably includes manipulating the closures to thus afford access to the indicia of the commodities in the respective containers. If the commodities are arrays of smokers' products having filter mouthpieces, such filter mouthpieces are preferably adjacent to the respective closures and the mouthpieces of each array of filter cigarettes can be provided with a plurality of indicia. The step of generating second signals in connection with testing of containers containing commodities of the just described character can include contacting the filter mouthpieces with a signal generating implement (such as a suitable detector) which can reach the mouthpieces upon completed manipulation of the respective closures to expose the filter mouthpieces. The method of generating second signals in accordance with a method which includes the step of generating second signals in the just outlined manner can include ascertaining the positions of the plurality of indicia relative to each other.

The method can further include the step of generating a defect signal in response to detection of identical second signals upon ascertainment of information represented by indicia on the contents of at least two successively tested containers.

The indicia can assume the form of or can include metallic objects such as pieces of metallic foil or films of metallic material.

The method can further comprise the step of displaying the results of each comparing step.

Another feature of the present invention resides in the provision of an apparatus for ascertaining the genuineness of the contents of containers which confine commodities and bear information purporting to denote the originator(s) of the commodities. The commodities in the containers which are tested in the apparatus of the present invention are provided with indicia denoting the actual originator(s). The improved apparatus comprises means for generating first signals which denote the information borne by the containers, means for generating second signals denoting the information which is represented by the indicia on or in confined commodities and is accessible upon at least partial opening of the containers, and means for comparing the first signals with the respective second signals.

The contents of the containers can constitute or include arrays of rod-shaped smokers' products at least some of which exhibit identifying indicia. The first signals generated by the apparatus for testing such containers are or can be indicative of the positions of indicia in or on the contents of an at least partially opened container relative to each other.

The information which is borne by the containers is or can be encoded, and the apparatus then further comprises means for decoding the encoded information prior to the generation of the respective first signals.

The means for generating second signals can comprise a detector which is arranged to contact the commodities upon partial opening of the respective containers. Such detector can comprise its own energy source and can constitute a mechanical, optical, electrical, magnetic or other suitable detector.

The indicia can include or constitute metallic indicia.

If the containers are of the type having closures which are movable between open and closed positions, and if the commodities include arrays of rod-shaped smokers' products having filter mouthpieces, such filter mouthpieces are adjacent the closures of the respective containers and the indicia can include metallic indicia which are provided on at least some of the mouthpieces and are detectable by the detector upon movement of the closures to their operative positions.

The apparatus can further comprise means for displaying the outcome of comparison of first signals with the respective second signals.

The information which is borne by the containers can include or constitute printed matter.

The novel features which are considered as characteristic of the invention are set forth in particular in the appended claims. The improved apparatus itself, however, both as to its construction and the modes of assembling, installing and operating the same, together with additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
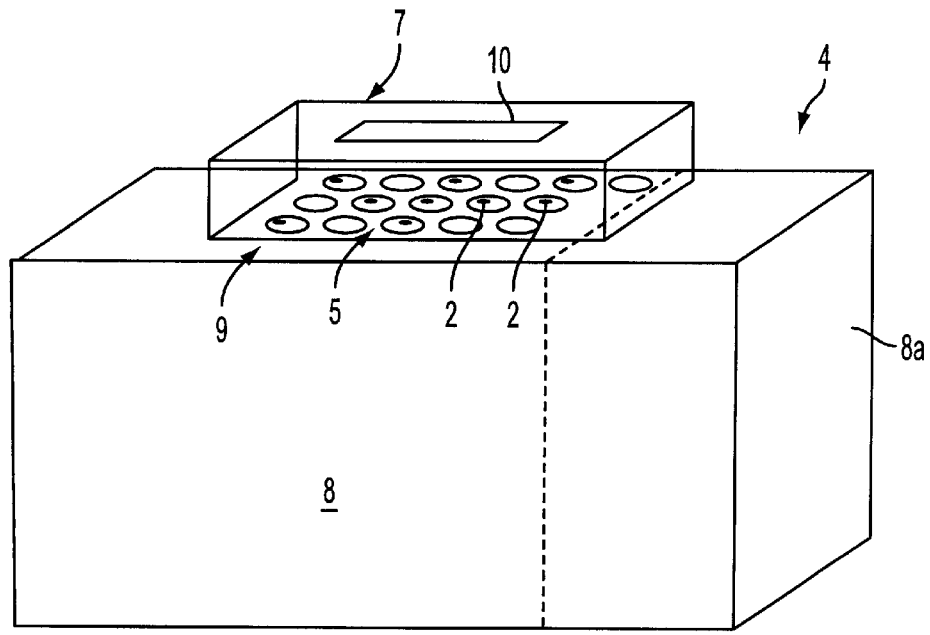
FIG. 1 is a schematic perspective view of a closed cigarette pack having a box-shaped container bearing information which is being decoded and memorized by a detector forming part or constituting one embodiment of the improved apparatus.
Figure 2:
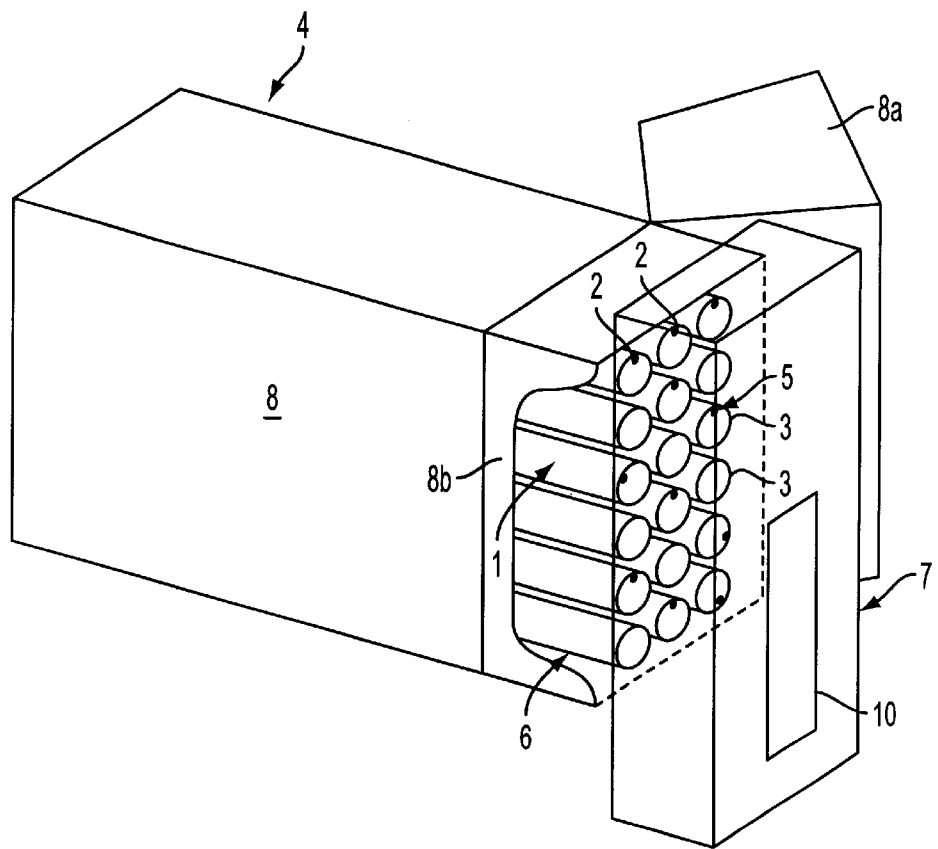
FIG. 2 is a perspective view of the cigarette pack of FIG. 1 with the closure of the container shown in open position and with the detector in a position it assumes during reading of the information represented by a pattern of randomly distributed indicia in or on the mouthpieces of filter cigarettes in the container.

FIG. 1 shows a sealed or closed hinged-lid pack 4 of filter cigarettes 1 (see FIG. 2). In the form as illustrated in FIG. 1, the pack 4 is assumed to include a container for a group or array 6 (FIG. 2) of eighteen filter cigarettes 1 each of which comprises a plain cigarette of unit length and a filter mouthpiece 3 of unit length. The manner of making such filter cigarettes is described and shown, for example, in commonly owned U.S. Pat. No. 5,135,008 granted Aug. 4, 1992 to Oesterling et al. for "METHOD OF AND APPARATUS FOR MAKING FILTER CIGARETTES". The container of the pack 4 comprises or can comprise a transparent or translucent outermost envelope which may comprise a tear strip or tear tape, a cardboard box 8 having a pivotable closure, cover or lid 8a, a customary collar 8b, and an inner envelope of tinfoil or the like, not shown.

In accordance with a feature of the invention, at least some of the filter cigarettes 1 in the array 6 carry identifying indicia 2 in the form of small or minute metallic films, layers, strips, bars or rods which are applied to the tubular wrappers of the mouthpieces 3 and/or to the tubular connectors (convoluted uniting bands) which serve to sealingly connect the filter mouthpieces to the respective plain cigarettes (reference may be had to the aforementioned commonly owned U.S. Pat. No. 5,135,008 to Oesterling et al.).

FIG. 1 shows the closure 8a in the operative position, and FIG. 2 shows this closure in one of those (open) positions in which it affords access to the mouthpieces 3.

The indicia 2 can be applied to the filter mouthpieces 3 during the making of a continuous filter rod which is thereupon severed to yield discrete mouthpieces of desired length. This will be described with reference to FIG. 3. Alternatively, the indicia 2 can be applied to one or both sides of the wrapping material (such as the web 18 shown in FIG. 3) which is converted into the tubular envelopes of discrete mouthpieces 3 and/or to one or both sides of the strip of so-called tipping paper which is divided into discrete uniting bands; such bands are thereupon convoluted around the filter mouthpieces and the adjacent end portions of plain cigarettes to form filter cigarettes of unit length or multiple unit length (reference may be had again to the aforementioned U.S. Pat. No. 5,135,008 to Oesterling et al.). A machine which can be utilized for the making of a filter rod and of discrete filter mouthpieces is disclosed, for example, in commonly owned U.S. Pat. No. 4,412,505 granted Nov. 1, 1983 to Häusler et al. for "APPARATUS FOR APPLYING ATOMIZED LIQUID TO A RUNNING LAYER OF FILAMENTARY MATERIAL OR THE LIKE". An apparatus for assembling arrays of the type shown at 6 in FIG. 2 is disclosed, for example, in commonly owned U.S. Pat. No. 4,471,866 granted Sep. 18, 1984 to Erdmann et al. for "APPARATUS FOR ASSEMBLING ARRAYS OF CIGARETTES IN PACKING MACHINES".

The indicia 2 in or on the eighteen filter mouthpieces 3 of FIG. 2 together form a pattern 5 which is characteristic of the array 6 shown in FIG. 2. The maker or authorized distributor (originator) of the filter cigarettes 1 applies to the exterior of the container of the pack 4 information 9 (see FIG. 1) which is indicative of the pattern 5. Thus, if the cigarettes 1 are genuine (i.e., if they were produced by the maker the name and/or the trademark(s) of which appears or appear at the exterior of the container), the intelligence represented by the pattern 5 of indicia 2 must be identical with or otherwise representative of that denoted by the information 9 applied to the exterior of the container forming part of the hinged-lid pack 4 shown in FIGS. 1 and 2.

Otherwise stated, the cigarettes 1 are not imitations made by a competitor of the owner identified at the outside of the container including the box 8, or by any other unauthorized party, if the information furnished by the pattern 5 is identical with or sufficiently related to the information 9 at the outside of the box 8. Therefore, the genuineness of the cigarettes 1 (i.e., of the contents of the box 8) can be ascertained by comparing the information 9 with that represented by the pattern 5 of indicia 3.

The information represented by the pattern 5 can be ascertained without affecting the integrity of the pack 4 or by opening the container of the pack 4 to the extent substantially as shown in FIG. 2 (i.e., in a manner as is done by the purchaser of the pack in order to gain access to the cigarettes 1) and by thereupon resorting to a mechanical, electrical, magnetic, optical or other suitable detector 7. Such detector is used to interpret the pattern 5 to the extent which is necessary to compare this information with the information 9. The results of the comparison of the first signal(s) denoting the information presented by the pattern 5 with the second signal(s) denoting the information 9 can be exhibited by a display 10 which forms part of or is operatively associated with the detector 7. Alternatively, the results of the comparison can be made known by the generation or lack of generation of an audible and/or visible signal. The signal can be (a) a defect signal if the comparison carried out by the detector 7 indicates the presence of an imitation, or (b) a signal denoting the detection of a genuine product.

The detector 7 can constitute a magnetic detector if the indicia 2 are particles or films or layers of a metallic material which can be reliably detected at least when the closure 8a is pivoted from the closed position of FIG. 1 to the open position of FIG. 2 so that one side of the detector 7 can be placed close to or into direct contact with the end faces of the filter mouthpieces 3. The detector 7 can ascertain the spatial relationship of the indicia 2 relative to each other and can memorize the thus obtained information (signal) for subsequent comparison with the information 9 or vice versa.

If the container of the pack 4 comprises an innermost envelope (i.e., a converted blank within the box 8), such innermost envelope can remain in its normal position if the material of which the innermost envelope is made does not interfere with the monitoring of the information represented or furnished by the pattern 5 of indicia 2 borne by the eighteen filter mouthpieces 3 shown in FIG. 2.

The manner in which the arrays 6 are assembled (e.g., in a packing machine including the structure shown and described in the aforementioned U.S. Pat. No. 4,471,886 to Erdmann et al.) is such that the likelihood of identity of two or more patterns 5 is practically nil, i.e., the detection of two or more identical patterns 5 is an indication of the presence of imitations in at least one of the tested packs and, therefore, the detector or 7 (or a part receiving signals from this or an analogous detector) is normally set up to generate a defect signal (i.e., a signal denoting the presence of a defective (phony) array 6) as soon as the detector ascertains the presence of two or more identical patterns.

The information 9 at the exterior of the container or box 8 can be visible (e.g., printed) information or information which is not visible to the naked eye. If such information is encoded on the box 8, the detector 7 is equipped with suitable means for decoding such information prior to generating a signal which can be properly compared with the signal denoting the information represented by the pattern 5 of indicia 2.

The detector 7 can constitute a reading unit which can resemble a check card or a lighter (or can further serve as a cigarette lighter) and is designed to memorize the information furnished at 9 for comparison with information represented by the pattern 5 in the respective box 8, or vice versa.

It goes without saying that the improved method and apparatus can be resorted to, with equal or similar advantage, for the testing of genuineness or authenticity of other types and/or other groupings of rod-shaped smokers' products. Moreover, the number of discrete commodities in the box 8 or another suitable packet can vary between one, two or more, as long as the indicium or indicia is or are applied in a manner which cannot be imitated by unauthorized parties.

The exact nature of the indicia 2 or analogous indicia can be selected practically at will, as long as such indicia and/or their spatial relationships (if the contents of a packet are provided with two or more indicia) adequately denote the contents of the box; all that counts is to ensure that the absence of identity or compatibility of the information 9 with that represented by the indicium or indicia provided on the contents of the container is a reliable indicator of the presence of unauthorized imitations. For example, if the nature of the contents of a container is such that the contents exhibit one or more characteristics suitable to serve as indicia denoting a genuine product or assembly of two or more products, the provision of intentionally applied indicia 2 is not necessary.

The detector 7 is preferably constructed and assembled in such a way that it comprises its own energy source, e.g., one or more batteries. This renders it possible to put the detector to use in locales where a suitable energy source is not available.

Figure 3:
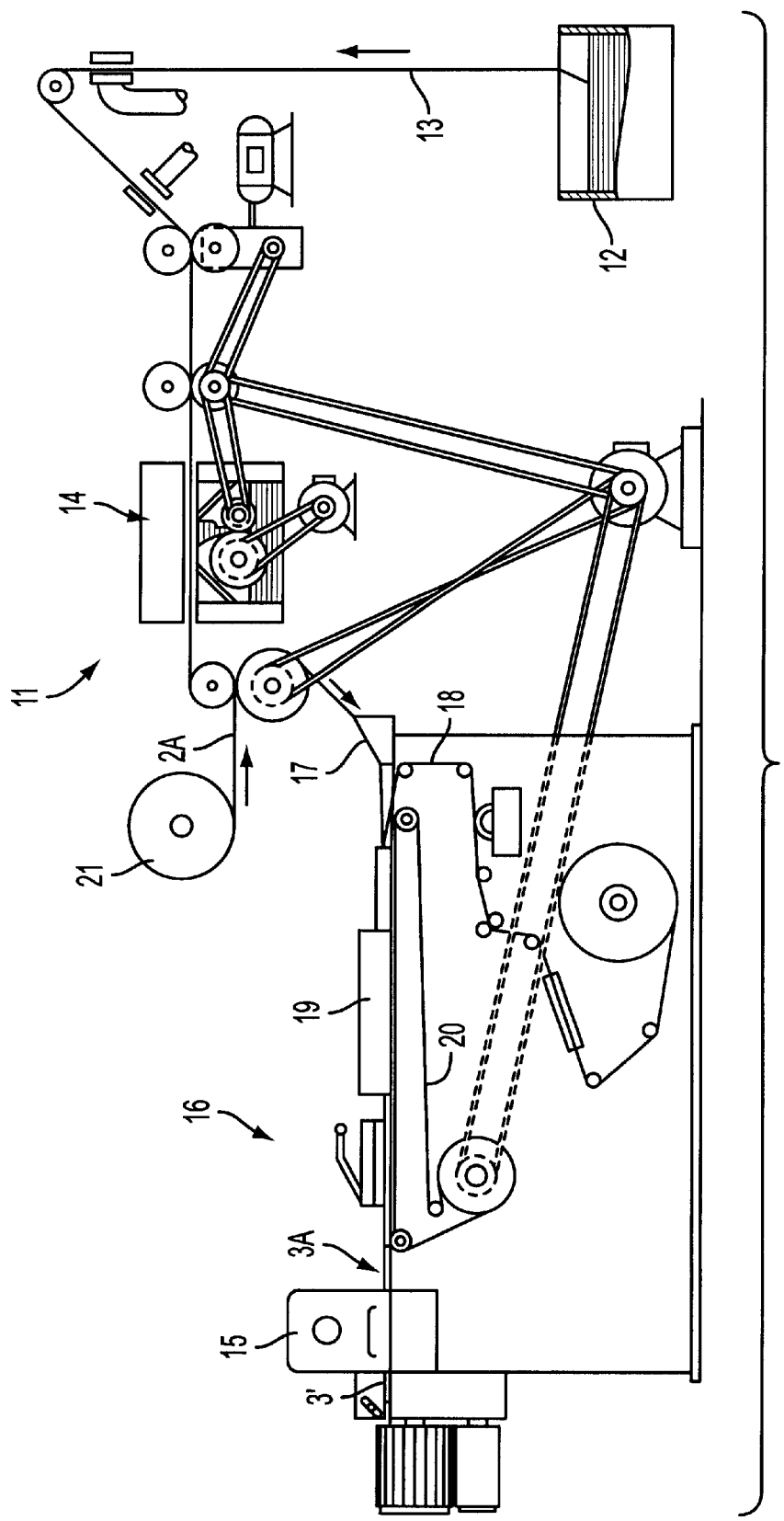
FIG. 3 is a schematic elevational view of a filter rod making machine which is equipped with means for providing filter mouthpieces with identifying indicia.

FIG. 3 shows certain details of a filter rod making machine which is similar to that disclosed in U.S. Pat. No. 3,974,007 granted Aug. 10, 1976 to Greve for "METHOD AND APPARATUS FOR THE PRODUCTION OF FILTER ROD SECTIONS OR THE LIKE". Another filter rod making machine of the general character shown in FIG. 3 is described and illustrated in the aforementioned commonly owned U.S. Pat. No. 4,412,505 to Häusler et al.

The machine of FIG. 3 comprises a tow processing or tow preparing first unit or section 11 serving to apply a suitable atomized plasticizer to a stretched running tow 13 of filamentary filter material for tobacco smoke. The tow 13 is drawn off a bale 12 and is loosened, stretched and sprayed with plasticizer (at 14) on its way to a gathering horn 17 ahead of a wrapping section 16. Successive increments of the tow 13 leaving the gathering horn 17 are draped into a running web or strip 18 of wrapping material (such as cigarette paper). Conversion of the web 18 into a tubular wrapper of the thus obtained filter rod 3A is completed at the station 19 including a conveyor 20 known as garniture. The filter rod 3A is repeatedly severed at 15 to yield a file of successive filter rod sections 3' of double unit length because such filter rod sections are normally utilized in filter tipping machines which receive filter rod sections 3' from the machine of FIG. 3. A presently preferred tipping machine is that disclosed in the aforementioned U.S. Pat. No. 5,135,008 to Oesterling et al.

FIG. 3 further shows a reel 21 serving as a source of a web or strip 2A which is caused to advance with the running tow 13 into the gathering horn 17 and thence to the station 19 where it is draped into the wrapping material 18 to form part of the filter rod 3A. The web 2A advances and is repeatedly severed (at 15) jointly with the filter rod 3A to ultimately constitute a strip-shaped indicium 2 (see FIGS. 2 and 4) in each of the thus obtained discrete filter rod sections or mouthpieces 3.

Figure 4:
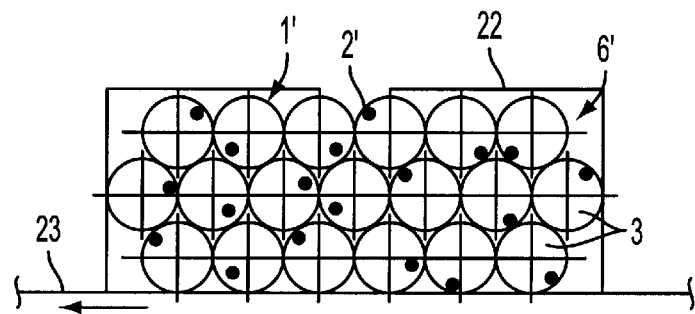
FIG. 4 is a schematic elevational view of a conveyor for the transport of cigarette packs and/or constituents of cigarette packs in a packing machine which is set up to accumulate filter cigarettes into groups, arrays or formations each of which includes nineteen cigarettes each including a filter mouthpiece of the type turned out by the machine shown in FIG. 3.

The manner in which the filter cigarettes 1 can be assembled into quincunx formations 6 of FIG. 2 or into similar formations or arrays 6' shown in FIG. 4 is disclosed, for example, in the aforementioned commonly owned U.S. Pat. No. 4,471,886 to Erdmann et al.

It is also possible to replace the metallic strip or web 2A with a web having a specific color (e.g., a color sufficiently different from that of the web 18 and/or from that of the tow 13) so that it can be readily detected by a color-sensitive detector replacing the detector 7.

The filter rod sections 3' of double unit length which leave the filter rod making machine of FIG. 3 and are thereupon assembled with plain cigarettes of unit length (e.g., in a manner as disclosed in the aforementioned U.S. Pat. No. 5,135,008 to Oesterling et al.) prior to being introduced into the machine of U.S. Pat. No. 4,471,866 to Erdmann et al. ultimately form part of arrays or groups of the type shown in FIGS. 2 and 4. Each such group 6 can comprise eighteen filter cigarettes 1 of unit length (see FIG. 2) and the strips 2 are in random (haphazard) distribution insofar as their angular positions are concerned. The advantages of such random distribution are the same as those already described with reference to FIGS. 1 and 2. FIG. 4 shows an array 6' of nineteen filter cigarettes 1.

The receptacle 22 shown in FIG. 4 corresponds to one of the receptacles or pockets 3 shown in FIG. 2 of U.S. Pat. No. 4,471,866 to Erdmann et al., and the reference character 23 denotes a conveyor corresponding to the conveyor 2 in FIG. 2 of the patent to Erdmann et al. As a rule, each of a short or long series of groups one of which is shown at 6' in FIG. 4 has a different distribution of strips 2.

Figure 5:
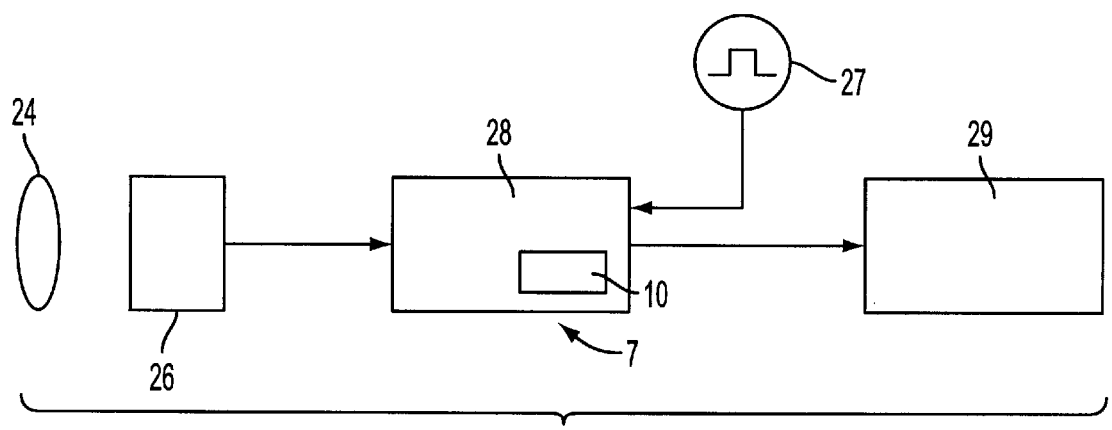
FIG. 5 is a diagrammatic view of an apparatus which is constructed and assembled to encode, apply, decode and process information pertaining to identifying indicia borne by some or all of the filter mouthpieces in cigarette packs of the type shown, for example, in FIGS. 1 and 2.

The detector 7 of FIG. 5 serves to monitor successive patterns 5 during successive intervals of idleness of the stepwise advancing conveyor 23. For example, the detector 7 can constitute a commercially available matrix camera. Alternatively, or in addition to the detector 7, the apparatus of FIG. 5 can comprise a detector 26 which can constitute a commercially available CCD camera. The latter can be positioned to monitor the front end faces of filter rod sections 3' shown in FIG. 4 and/or the information 9 on the box 8 of FIG. 1. The camera 26 comprises an objective lens 24; this camera can constitute a line-by-line camera of the type known as Series JR2048 distributed by the Firm Sch äfter & Kirchhoff, Hamburg, Federal Republic Germany.

The reference character 27 denotes in FIG. 5 a timer which is set up to generate synchronous high-frequency pulses during stepwise monitoring or scanning of the end portions of the filter rod sections or filter mouthpieces 3 of the cigarettes 1 shown in FIG. 2 or the filter mouthpieces 3' of the filter cigarettes 1' shown in FIG. 4. FIG. 5 further shows an image processing circuit 28 which ascertains the positions of the indicia 2 or 2' and determines or sets up corresponding evaluating windows.

FIG. 4 shows, by way of example, that the cross-sectional area of each filter cigarette 1' can be subdivided into four fields 1–4 (as seen in the clockwise direction and starting at the twelve o'clock position). Other divisions or subdivisions of the cross-sectional areas of the cigarettes 1' can be selected with equal advantage. For example, each such cross-section can be divided into eight fields each of which extends along an arc of 45° to permit a more accurate determination of the locus of an indicium 2'.

Referring again to FIG. 4, the indicia 2' in the uppermost row of filter cigarettes 1' are located in the first, third, second, fourth, second and third quadrants of successive filter cigarettes 1' (as seen from left to right) which adds to an encoding identified by the numeral 15. In the third or lowermost row of the group or array 6' shown in FIG. 4, the encoding numeral is 18, and in the median row the encoding numeral is 14. The first quadrants extend from 0° to 90° (i.e., from the twelve o'clock to the three o'clock position), the second quadrants extend from 90° to 180°, and so forth. Such information is processed (encoded) by the circuit 28 which generates encoded information 9 that is imprinted upon or otherwise applied to the box 8 of the respective cigarette pack (containing the group 6 or 6'). For example, the encoded information can be denoted by the numeral 47 (i.e., 15+14+18).

The reference character 29 denotes in FIG. 5 a printer which applies the encoded information (47) to the box or packet (such as 8) of the respective cigarette pack. The printer 29 can constitute an ink jet printer or an inscribing laser of any conventional design, e.g., that offered by the German Firm IWK Verpackungstechnik GmbH (jet printers) or by the Firm Domino Laser, Inc. (inscribing lasers).

The detector 7 can further serve as a means for decoding the information which was imprinted upon or otherwise applied to the packet of the respective cigarette pack containing an array or group 6 or 6'. The image processing unit 28 is then replaced with a non-programmed unit which can decode the information previously applied by the printer 29, and the non-programmed processing unit is preferably further designed to compare the decoded information (symbol or symbols) with the information previously obtained or ascertained by the detector 7 or 26. The decoding assembly further employs the display 10 which replaces or is utilized jointly with the printer 29 and serves to exhibit the decoded information (the timer 27 is not necessary for the carrying out of such steps of the improved method).

The exact details of all constituents of the improved apparatus form no part of the present invention. Such constituents are or can be commercially available units or modules, as long as they can be assembled and can cooperate in the aforedescribed manner or in an analogous manner to facilitate the carrying out of the improved method.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of ascertaining the origin of packaged commodities and, therefore, such adaptations should and are intended to be comprehended within the meaning and range of equivalence of the appended claims.

What is claimed is:

1. A method of ascertaining the genuineness of the contents of containers which confine commodities and bear information purporting to denote the originator of the commodities, the commodities in the containers being provided with a plurality of indicia denoting the actual originator, comprising the steps of:

generating a first signal denoting the information borne by the containers;

at least partially opening the containers to afford access to the indicia of the commodities therein;

ascertaining the positions of said plurality of indicia relative to each other and generating second signals denoting the information represented by the accessible indicia ascertained during the ascertaining step; and comparing the first signal with the respective second signals.

2. The method of claim 1, wherein the commodities are arrays of parallel rod-shaped smokers' products.

3. The method of claim 1, wherein the information borne by the containers is encoded and further comprising the step of decoding the information borne by a container prior to generation of the first signal.

4. The method of claim 1 of ascertaining the genuineness of the contents of containers having closures which are manipulated to gain access to the confined commodities, wherein said opening step includes manipulating the closures to thus afford access to the indicia of the commodities in the respective containers.

5. The method of claim 4, wherein the commodities are arrays of smokers' products having filter mouthpieces adjacent the respective closures and provided with a plurality of indicia.

6. The method of claim 5, wherein said step of generating second signals includes contacting the filter mouthpieces with a signal generating implement which can reach the mouthpieces upon completed manipulation of the respective closures to expose the filter mouthpieces.

7. The method of claim 1, further comprising the step of generating a defect signal in response to detection of identical second signals upon ascertainment of information represented by indicia on the contents of at least two successively tested containers.

8. The method of claim 1, wherein the indicia are in the form of metallic objects.

9. The method of claim 1, further comprising the step of displaying the result of said comparing step.

10. Apparatus for ascertaining the genuineness of the contents of containers confining commodities and bearing information purporting to denote the originator of the commodities, the commodities being provided with a plurality of indicia denoting the actual originator, comprising:

means for generating first signals denoting the information borne by the containers;

means for ascertaining the positions of the plurality of indicia relative to each other;

means for generating second signals denoting the information represented by the relative positions of the plurality of indicia on confined commodities and being accessible upon at least partial opening of the containers; and means for comparing the first signals with the respective second signals.

11. The apparatus of claim 10 for ascertaining the genuineness of the contents of containers confining commodities which consist of arrays of rod-shaped smokers' products at least some of which exhibit identifying indicia, wherein said first signals are indicative of the positions of indicia relative to each other.

12. The apparatus of claim 10, wherein the information borne by the containers is encoded and further comprising means for decoding the encoded information prior to generation of the respective first signals.

13. The apparatus of claim 10, wherein the means for generating second signals comprises a detector arranged to contact the commodities upon partial opening of the respective containers.

14. The apparatus of claim 13, wherein said detector includes an energy source.

15. The apparatus of claim 13, wherein said detector is one of mechanical, optical, electrical and magnetic detectors.

16. The apparatus of claim 13, wherein the indicia include metallic indicia.

17. The apparatus of claim 13, wherein the containers have closures movable between open and closed positions and the commodities include arrays of rod-shaped smokers' products having filter mouthpieces adjacent the respective closures, said indicia including metallic indicia provided on at least some of the mouthpieces and being detectable by said detector upon movement of the closures to said open positions.

18. The apparatus of claim 10, further comprising means for displaying the outcome of comparison of first signals with the respective second signals.

19. The apparatus of claim 10, wherein the information borne by the containers includes printed matter.

20. The method of claim 1, wherein the plurality of indicia includes a first marker on one of the commodities and a second marker on one of the other commodities, wherein the generating the second signals step includes generating the second signal denoting the relative positions of the first and second markers.

* * * * *